Patented Aug. 28, 1928.

1,682,181

UNITED STATES PATENT OFFICE.

CARL S. MINER AND ELMER W. TROLANDER, OF CHICAGO, ILLINOIS, ASSIGNORS, BY MESNE ASSIGNMENTS, TO THE DELATONE COMPANY, OF CHICAGO, ILLINOIS, A CORPORATION OF ILLINOIS.

DEPILATORY.

No Drawing. Application filed September 2, 1924. Serial No. 735,500.

The subject-matter of this invention is an improved depilatory of paste form, and a method for preparation of the same. The advantages of paste form for depilatories as distinguished from powder or liquid forms, are generally recognized and include convenience of handling and application, control of the quantity applied, and capacity for adhesion to the treated areas. As they necessarily must contain some moisture, heretofore paste depilatories have been subject to certain rather serious objections which, in a considerable measure, have offset their advantages. One objectionable feature has been their repulsive color, usually a dirty green which gradually turns to a dirty greenish black as the preparation ages. Another has been the highly offensive odor, resulting from the decomposition of the sulphides which constitute the usual active agents, and the tendency of the odor to cling to the skin portions to which the material has been applied.

The purpose of the present invention is the provision of a paste depilatory in which the above mentioned disadvantages will be eliminated or minimized.

Another object is the preparation of a paste depilatory which will not be seriously affected by age when packed in suitable containers.

While it might appear that the offensive odor of a mixture of this type might be removed by the addition of an alkaline agent, which, theoretically, would have the effect of counteracting the supposedly acid character of the gaseous products, or by the addition of some substance designed to absorb the odorous gas, actual practice has demonstrated that the expected deodorizing results are not obtained from such expedients, and that, in fact, attempts in that direction have the effect of increasing the production of sulphide odors and produce also the undesirable coloration of the mixture as above described. We have found, on the other hand, that the desired results may be obtained by the use of a filler or diluent which is originally of light color and which is incapable, so far as possible, not only of entering into combination with the sulphides, but which also will not, when combined with water, form products capable of chemical combination with the gas-producing agents in the mixture. From our investigations, we hold the belief that discolorations of the mixture result from the action of the sulphides or the sulphide gases upon traces of iron or similar impurities in materials used which are supposedly inert.

We have found that by avoiding, so far as possible, any subsequent reactions in the mixture, such as the supposedly neutralizing action heretofore suggested, the best results in the direction of minimizing the sulphide odor are obtained, and a product is secured in which the remaining traces of sulphide odor may be masked with perfumes or essential oils, so as practically to eliminate it from observation. Moreover the reduction thus secured in the quantity of odorous gas eliminates the odorizing of the skin areas to which the depilatory is applied.

In the preparation of our improved article, a sulphide suitable for accomplishing the depilating action is utilized, such as barium sulphide, and this is mixed in the proper proportion with a light colored filler or diluent which is highly insoluble in the liquid which is utilized to form the paste, and which is chemically inert with respect to the liquid and the sulphide, and free from impurities such as iron. We have found barium sulfate a highly satisfactory material for this use, especially that grade which is prepared for use in the photographic and therapeutic arts, and now quite generally known as X-ray barium sulfate. These are thoroughly mixed out of contact with metal, and reduced to a homogenous paste by the addition of distilled water and suitable working. As specific proportions we suggest barium sulphide 8 ounces, barium sulfate 80 ounces, water 116 ounces. The paste so produced is of very light, practically white, color and of proper consistency for packing in collapsible tubes or other suitable dispensing containers. It is desirable to select for the containers materials which will not enter into chemical combination with the sulphide. The paste may be effectively perfumed, or it may be used without such addition, as its sulphide odor is inconsiderable. When kept from exposure to air or from contact with metal or other substances upon which the sulphide might act, this mixture will maintain its moist condition practically indefinitely without formation of any substantial amount of gaseous decomposition products of noxious odor, and without discoloration.

It is pointed out in the specification and claims that the inorganic filler should be free of iron and free of alkaline materials. The alkaline materials are objectionable for the reason that they appear to hasten decomposition of the sulphide with the production of hydrogen sulphide gas, while the iron is principally objectionable because of the fact that it reacts with the ingredients of the mixture to produce an undersirable color. The inorganic filler should be free of iron and free of alkaline materials so as to eliminate these undesirable qualities.

What we claim is:

1. A depilatory paste comprising barium sulphide and barium sulphate.

2. A substantially permanent depilatory paste comprising a depilatory sulphide, a liquid and X-ray barium sulphate as a diluent for the depilatory sulphide.

3. A substantially permanent depilatory paste comprising a depilatory sulphide, a liquid and barium sulphate as a diluent for the depilatory sulphide.

4. A substantially permanent depilatory paste comprising a depilatory sulphide, a liquid and a chemically inert inorganic filler free of alkaline material and free of iron.

In testimony whereof we have hereunto subscribed our names.

CARL S. MINER.
ELMER W. TROLANDER.